United States Patent
Hermann

(10) Patent No.: US 7,940,028 B1
(45) Date of Patent: May 10, 2011

(54) THERMAL ENERGY TRANSFER SYSTEM FOR A POWER SOURCE UTILIZING BOTH METAL-AIR AND NON-METAL-AIR BATTERY PACKS

(75) Inventor: Weston Arthur Hermann, Palo Alto, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 12/951,010

(22) Filed: Nov. 20, 2010

Related U.S. Application Data

(63) Continuation of application No. 12/951,006, filed on Nov. 20, 2010.

(60) Provisional application No. 61/372,351, filed on Aug. 10, 2010.

(51) Int. Cl.
*H02J 7/04* (2006.01)
*H02J 7/14* (2006.01)

(52) U.S. Cl. .................... 320/151; 320/150; 320/104

(58) Field of Classification Search .......... 320/151, 320/104
See application file for complete search history.

(56) References Cited

U.S. PATENT DOCUMENTS

| | | | |
|---|---|---|---|
| 6,773,842 B2 * | 8/2004 | Liu et al. ................ | 429/407 |
| 7,629,773 B2 * | 12/2009 | Eberhard et al. ........ | 320/150 |
| 2009/0139781 A1 * | 6/2009 | Straubel ................. | 180/65.1 |

* cited by examiner

*Primary Examiner* — M'baye Diao
(74) *Attorney, Agent, or Firm* — Patent Law Office of David G. Beck

(57) ABSTRACT

A power source comprised of a metal-air battery pack and a non-metal-air battery pack is provided, wherein thermal energy from the metal-air battery pack is used to heat the non-metal-air battery pack. In one aspect, a thermal energy transfer system is provided that controls the flow of thermal energy from the metal-air battery pack to the non-metal-air battery pack. In another aspect, the flow of thermal energy from the metal-air battery pack to the non-metal-air battery pack is controlled and used to heat the non-metal-air battery pack prior to charging the non-metal-air battery pack.

15 Claims, 5 Drawing Sheets

THERMAL ENERGY TRANSFER SYSTEM FOR A POWER SOURCE UTILIZING BOTH METAL-AIR AND NON-METAL-AIR BATTERY PACKS

CROSS-REFERENCE TO RELATED APPLICATION

This application is a continuation of U.S. patent application Ser. No. 12/951,006, filed Nov. 20, 2010, the disclosure of which is incorporated herein by reference for any and all purposes. This application claims benefit of the filing date of U.S. Provisional Patent Application Ser. No. 61/372,351, filed Aug. 10, 2010, the disclosure of which is incorporated herein by reference for any and all purposes.

FIELD OF THE INVENTION

The present invention relates generally to batteries and, more particularly, to means for maximizing charging efficiencies when utilizing battery packs of differing types.

BACKGROUND OF THE INVENTION

A metal-air cell is a type of electro-chemical battery that utilizes the same energy storage principles as a more conventional cell such as a lithium ion, nickel metal hydride, nickel cadmium, or other cell type. Unlike such conventional cells, however, a metal-air cell utilizes oxygen as one of the electrodes, typically passing the oxygen through a porous metal electrode. The exact nature of the reaction that occurs in a metal-air battery depends upon the metal used in the anode and the composition of the electrolyte. Exemplary metals used in the construction of the anode include zinc, aluminum, magnesium, iron, lithium and vanadium. The cathode in such cells is typically fabricated from a porous structure with the necessary catalytic properties for the oxygen reaction. A suitable electrolyte, such as potassium hydroxide in the case of a zinc-air battery, provides the necessary ionic conductivity between the electrodes while a separator prevents short circuits between the battery electrodes.

Due to the use of oxygen as one of the reactants, metal-air cells have some rather unique properties. For example, since the oxygen does not need to be packaged within the cell, a metal-air cell typically exhibits a much higher capacity-to-volume, or capacity-to-weight, ratio than other cell types making them an ideal candidate for weight sensitive applications or those requiring high energy densities.

While metal-air cells offer a number of advantages over a conventional rechargeable battery, most notably their extremely high energy density, such cells also have a number of drawbacks. For example, care must be taken to avoid undesired electrolyte water loss, especially in high temperature, low humidity environments. More importantly, it is necessary to insure a sufficient supply of air to the cells during discharge cycles, and means for handling the oxygen emitted from the cells during the charge cycles. Another potential disadvantage of a metal-air cell is its discharge rate. Due to the kinetics of the reaction, the maximum discharge rate is far lower than that of many other types of cells, such as lithium-ion cells.

Accordingly, while metal-air cells offer some intriguing benefits, such as its high energy densities, their shortcomings must be taken into account in order to successfully integrate the cells into a system. The present invention provides such a system by combining a metal-air battery pack with a conventional battery pack in order to gain the benefits associated with each battery type.

SUMMARY OF THE INVENTION

The present invention provides a power source comprised of a metal-air battery pack and a non-metal-air battery pack, wherein thermal energy from the metal-air battery pack is used to heat the non-metal-air battery pack.

In at least one other embodiment of the invention, a method of controlling battery pack temperature during charging is provided, the method including the steps of (i) coupling an external power source to a battery charging system that is coupled to a first battery pack comprised of a plurality of metal-air cells and a second battery pack comprised of a plurality of non-metal-air cells (e.g., lithium ion cells, lithium ion polymer cells, nickel metal hydride cells, nickel cadmium cells, nickel hydrogen cells, nickel zinc cells, and silver zinc cells); (ii) initiating first battery pack charging; (iii) comparing second battery pack temperature to a preset temperature; (iv) initiating second battery pack charging if the second battery pack temperature is greater than the preset temperature and not initiating second battery pack charging if the second battery pack temperature is less than the preset temperature; and (v) heating the second battery pack by transferring thermal energy from the first battery pack to the second battery pack if the second battery pack temperature is less than the preset temperature. The method may further include the steps of comparing the first battery pack temperature to a second preset temperature and transferring thermal energy from the first to the second battery pack at a first rate (or not at all) if the first battery pack temperature is less than the second preset temperature and at a second rate (greater than the first rate) if the second battery pack temperature is greater than the second preset temperature. The transfer of thermal energy from the first battery pack to the second battery pack may include the steps of directing airflow from a first battery pack outlet through a heat exchanger and pumping a heat transfer medium through a coolant loop that is in thermal communication with the second battery pack and the heat exchanger. The method may further include the steps of determining the SOC for the first and second battery packs, comparing the determined SOCs to target SOCs, and terminating charging of a particular battery pack when the monitored SOC exceeds the target SOC for that particular battery pack. The method may further include the steps of comparing the first battery pack temperature to a second preset temperature and initiating charging of the first battery pack if the first battery pack temperature is greater than the second preset temperature, not initiating charging of the first battery pack if the first battery pack temperature is less than the second preset temperature, and heating the first battery pack with a supplemental heating system if the first battery pack temperature is less than the second preset temperature.

In at least one other embodiment of the invention, a method of controlling battery pack temperature during charging is provided, the method including the steps of (i) coupling an external power source to a battery charging system that is coupled to a first battery pack comprised of a plurality of metal-air cells and a second battery pack comprised of a plurality of non-metal-air cells; (ii) monitoring first and second battery pack temperatures; (iii) monitoring first and second battery pack SOCs; (iv) comparing first and second battery pack SOCs to first and second target SOCs; and (v) optimizing the second battery pack temperature to minimize second battery pack charge time to reach the target SOC, the optimizing step further comprising the steps of controlling second battery pack charge rate and controlling the transfer of thermal energy from the first battery pack to the second battery pack via a heat exchanger and a coolant loop in thermal communication with the heat exchanger and the second battery pack. The step of controlling the transfer of thermal energy from the first battery pack to the second battery pack may include the step of directing airflow from a first battery pack outlet through the heat exchanger. The step of optimizing the second battery pack temperature may include the step of controlling operation of a refrigeration subsystem, the refrigeration subsystem in thermal communication with a second heat exchanger, wherein the coolant loop is in thermal communication with the second heat exchanger. The method may further comprise the steps of optimizing the first battery pack temperature to minimize first battery pack charge time to reach the target SOC, the optimizing step further comprising the steps of controlling first battery pack charge rate and controlling the transfer rate of thermal energy from the first battery pack to the second battery pack and the flow of thermal energy out of the first battery pack. The step of controlling the flow of thermal energy out of the first battery pack may include the step of controlling airflow out of a first battery pack outlet and through an exhaust duct.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably. The term "battery pack" as used herein refers to multiple individual batteries contained within a single piece or multi-piece housing, the individual batteries electrically interconnected to achieve the desired voltage and capacity for a particular application. The terms "battery" and "battery system" may be used interchangeably and as used herein refer to an electrical energy storage system that has the capability to be charged and discharged such as a battery or battery pack. The term "electric vehicle" as used herein refers to either an all-electric vehicle, also referred to as an EV, plug-in hybrid vehicles, also referred to as a PHEV, or a hybrid vehicle (HEV), a hybrid vehicle utilizing multiple propulsion sources one of which is an electric drive system. It should be understood that identical element symbols used on multiple figures refer to the same component, or components of equal functionality. Additionally, the accompanying figures are only meant to illustrate, not limit, the scope of the invention and should not be considered to be to scale.

Figure 1:
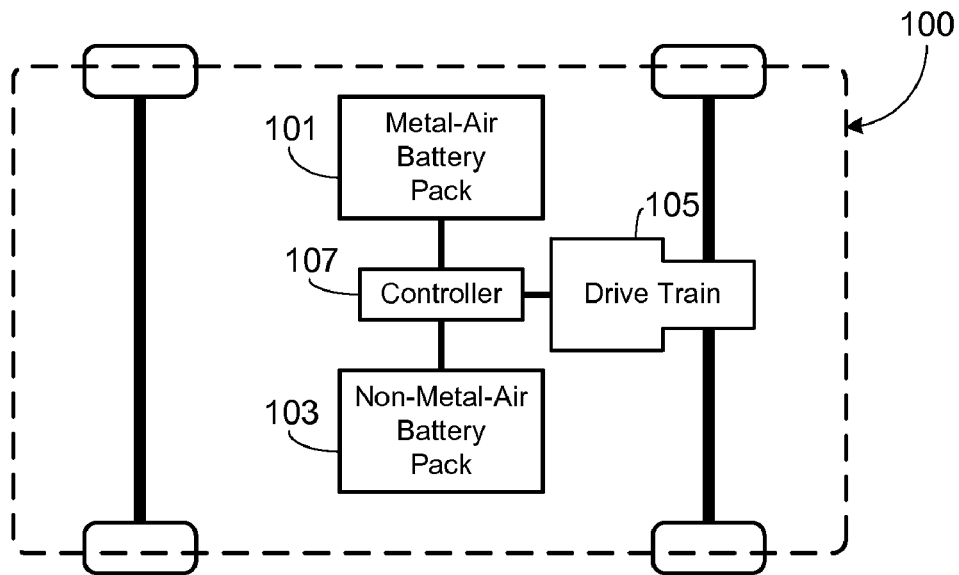
FIG. 1 illustrates the primary components of an electric vehicle that utilizes both a metal-air battery pack and a conventional battery pack.

Given the high energy density and the large capacity-to-weight ratio offered by metal-air cells, they are well suited for use in electric vehicles. Due to their limited power density, however, the present inventor has found their use to be most appropriate when combined with a more conventional power source, such as a lithium ion battery pack. This aspect is illustrated in FIG. 1 which shows the primary components of an EV 100 that utilizes both a metal-air battery pack 101 and a conventional battery pack 103. As used herein, metal-air batteries refer to any cell that utilizes oxygen as one of the electrodes and metal (e.g., zinc, aluminum, magnesium, iron, lithium, vanadium, etc.) in the construction of the other electrode. Conventional battery pack 103 utilizes non-metal-air cells, and preferably ones that provide high power density, thus providing a combined power source that achieves an optimal combination of energy and power. Exemplary batteries used in conventional battery pack 103 include, but are not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, etc. In a preferred application, battery packs 101 and 103 are coupled to one or more drive motors 105 that provide propulsion to one or more wheels of EV 100. A controller 107 is used to achieve an optimal balance between the two battery sources in light of the needs placed on the drive train, for example those placed on the system by the user (e.g., speed, acceleration, etc.), road conditions (e.g., uphill, downhill, etc.), charging system (e.g., available power, available time for charging, etc.), and environmental conditions (e.g., ambient temperature, battery pack temperature, etc.).

One of the advantages of using two different types of battery packs, and more specifically, a metal-air battery pack 101 and a conventional battery pack 103 (e.g., lithium-ion cells) is that the charging requirements for each are quite different. In accordance with the invention, these differences are used to improve the charging efficiency of the overall system.

Figure 2:
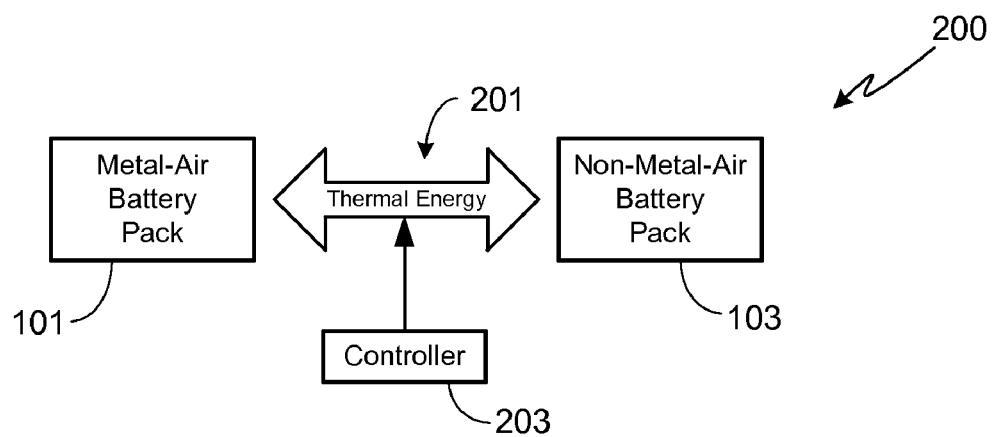
FIG. 2 illustrates the basic methodology of the invention.

In general, and as illustrated in FIG. 2, during charging thermal energy 201 is allowed, in a controlled fashion, to pass between the metal-air battery pack 101 and the conventional battery pack 103. The amount of thermal energy as well as the direction of flow of thermal energy is preferably controlled by a controller 203. Preferably controller 203 also controls the charge rate for each battery pack. Thus, for example, when both battery packs are cold, charging may be limited to the metal-air battery pack and excess thermal energy generated by the metal-air battery pack may be used to heat the non-metal-air, conventional battery pack. Then once the conventional battery pack has been sufficiently heated, charging of the conventional battery pack may be initiated (or the charge rate increased).

Figure 3:
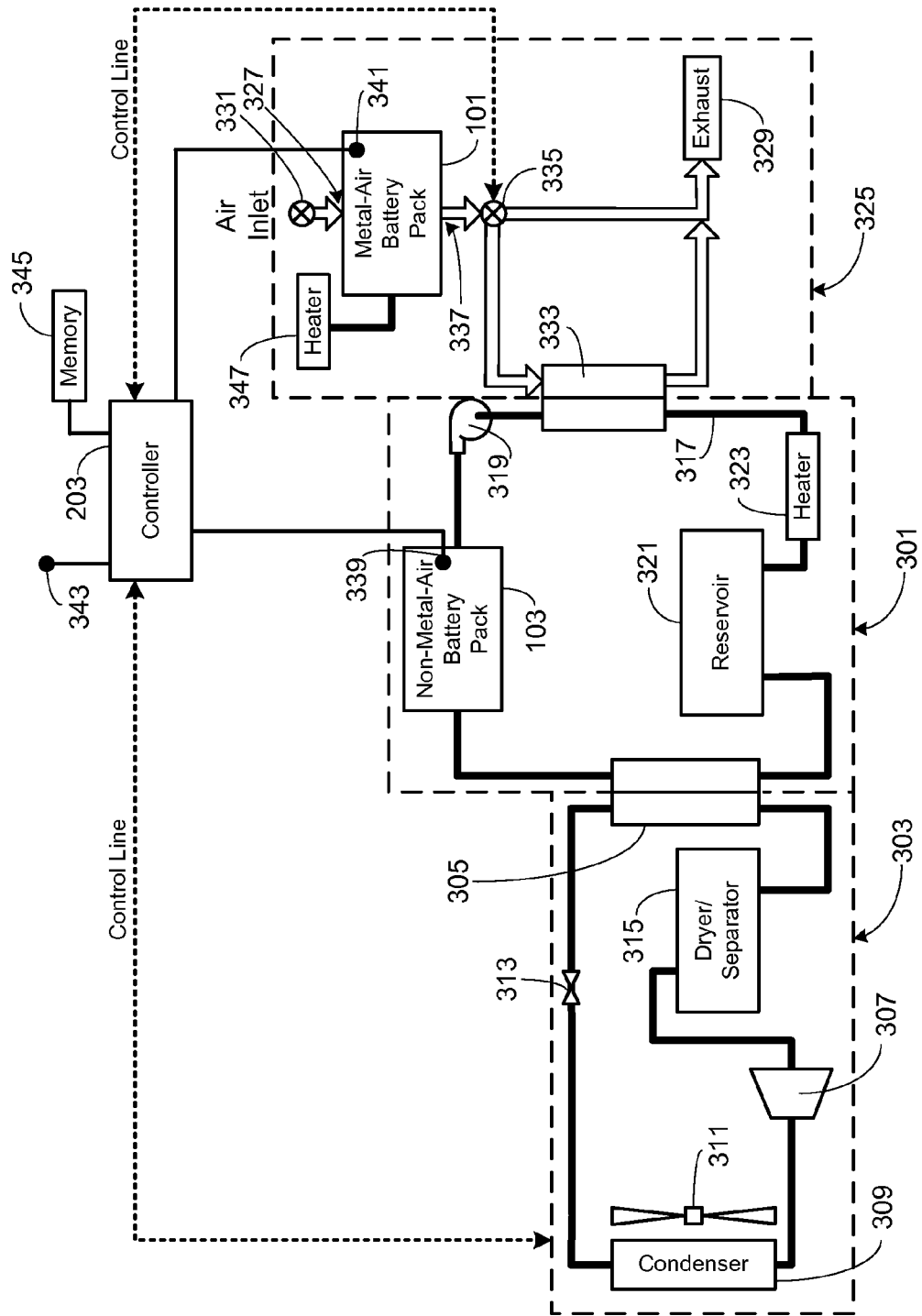
FIG. 3 illustrates a preferred embodiment of the invention.

FIG. 3 illustrates a preferred embodiment of the invention. As shown, a cooling system 301 that corresponds to conventional battery pack 103 is coupled to a refrigeration subsystem 303 via a heat exchanger 305. Refrigeration subsystem 303 may also be utilized by a heating, ventilation and cooling (HVAC) subsystem associated with the EV, as well as to cool other components within the drive and power control system (e.g., power electronics, motor(s), transmission, etc.). As these aspects of the vehicle's thermal management system do not alter the way in which the present invention operates, further discussion of these auxiliary thermal systems is not be provided herein.

It will be appreciated that there are a variety of ways in which a refrigeration subsystem, such as subsystem 303, may be implemented. The illustrated refrigeration subsystem is only meant to illustrate one such technique; other techniques/ variations are well known by those of skill in the art. Accordingly, it should be understood that other refrigeration subsystems may be used to cool the conventional battery pack without departing from the scope of the present invention.

In the preferred embodiment, and as illustrated in FIG. 3, refrigeration subsystem 303 is comprised of a compressor 307, condenser 309, fan 311, thermostatic expansion valve 313, dryer/separator 315, and heat exchanger 305. Compressor 307 compresses the low temperature refrigerant vapor in the subsystem into a high temperature vapor. The refrigerant vapor then dissipates a portion of the captured heat when it passes through condenser 309, thereby leading to a phase change from vapor to liquid, the liquid remaining at a high temperature and pressure. Preferably the performance of condenser 309 is enhanced by using a blower fan 311 as shown. The liquid phase refrigerant then passes through thermal expansion valve 313 which lowers both the temperature and pressure of the refrigerant as well as controlling the flow rate of refrigerant into heat exchanger 305. Heat exchanger 305 provides a simple means for transferring heat between the refrigerant contained in subsystem 303 and the coolants contained in battery pack cooling subsystem 101. After being heated in heat exchanger 305, the refrigerant is separated into the liquid and vapor phases by dryer/separator 315, thus insuring that only vapor passes through compressor 307. It should be appreciated that although refrigeration subsystem 303 is preferred, the invention can utilize other refrigeration subsystem configurations as previously noted. Regardless of the refrigeration subsystem configuration used, it includes a heat exchanger which can be used cooperatively with the battery cooling subsystem as described herein.

In battery pack cooling subsystem 301 a coolant, i.e., a heat transfer medium, that is in thermal contact with conventional battery pack 103 is used to control the battery pack's temperature. Preferably the coolant is a liquid and is thermally coupled to battery pack 103 via a heat transfer plate or coolant conduits that are integrated into the battery pack. In a preferred embodiment, the coolant is pumped through a coolant loop 317 by circulation pump 319, loop 317 being coupled to the battery pack. As the coolant circulates through coolant loop 317, thermal energy is transferred to or from conventional battery pack 103, preferably using one or more heat exchangers that are coupled to coolant loop 317 and various heating/cooling sources. For example, in the illustrated embodiment coolant loop 317 is coupled to refrigeration subsystem 303 via heat exchanger 305, thus allowing heat to be withdrawn from battery pack 103 and cooled via heat transfer with the refrigeration subsystem that is also coupled to heat exchanger 305. Preferably the battery cooling subsystem 301 also includes a coolant reservoir 321. While cooling loop 317 may also be thermally coupled to a heater 323 (e.g., a PTC heater), typically the temperature of the conventional battery pack 103 may be maintained within its preferred operating range using only refrigeration subsystem 303 and the heat generated by the metal-air battery pack 101 as described below.

It will be appreciated that there are numerous ways of controlling the amount of cooling supplied by refrigeration subsystem 303 to battery pack cooling subsystem 301. One approach is through the use of valves, for example a valve within coolant loop 317 can be used to control the flow of coolant through the cooling subsystem 301 and thus the level of cooling achieved via heat exchanger 305. Alternately, by varying the speed of coolant circulation pump 319, the degree of cooling can be varied. Alternately, bypass valves may be used to control the amount of coolant that flows through heat exchanger 305. Alternately, the amount of cooling supplied to heat exchanger 305 by the refrigeration cooling subsystem 303 may be controlled.

Metal-air battery pack 101 is included within a second battery pack subsystem 325. Subsystem 325 includes both an air inlet 327, required to supply air to the metal-air cells during the discharge cycle, and an air outlet 329, required to allow the oxygen emitted by the cells during charging to be exhausted out of the battery pack. Typically outlet 329 directs the flow outside of the EV. It will be appreciated that as the reaction within the metal-air cells requires oxygen to proceed, in some embodiments subsystem 325 includes a valve 331 corresponding to air inlet 327, thus providing a simple means of controlling the reaction rate of the cells within battery pack 101. In some embodiments the same duct is used both as the air inlet 327 and the air outlet 329.

Battery pack subsystem 325 is coupled to battery pack subsystem 301 via a heat exchanger 333. Heat exchanger 333 is coupled via valve 335 and suitable ducting to the air outlet 337 of metal-air battery pack 101, valve 335 controlling the flow of air passing through battery pack 101 that is coupled to heat exchanger 333 and/or coupled to air outlet 329. Heat exchanger 333 is coupled to the conventional battery pack subsystem 301 by coolant loop 317.

In one embodiment of the invention, controller 203 controls the flow of air from the metal-air battery pack 101 to heat exchanger 333 using valve 335, thus controlling the amount of metal-air pack generated thermal energy that is used to heat the conventional cells, for example lithium-ion cells, in battery pack 103. One or more temperature sensors are used to communicate the temperature of battery packs 101 and 103 to controller 203. For example, in the preferred embodiment at least one temperature sensor 339 monitors the temperature of conventional battery pack 103 and at least one temperature sensor 341 monitors the temperature of metal-air battery pack 101. Preferably at least one temperature sensor 343 monitors the ambient air temperature and communicates that information to controller 203. Sensors 339, 341 and 343 may use any of a variety of temperature sensing elements, e.g., thermocouples, thermistors, resistance temperature detectors (RTDs), etc. Although FIG. 3 only shows a single representative sensor for each battery pack, it should be understood that multiple temperature sensors are preferably located throughout each battery pack, thereby allowing the average temperature of the battery packs to be determined as well as temperature gradients throughout the packs. Also coupled to controller 203 is memory 345 (e.g., EPROM, EEPROM, flash memory, RAM, a solid state disk drive, a hard disk drive, or any other memory type or combination of memory types) that stores the desired operating parameters of the battery packs as well as the process instructions.

Figure 4:
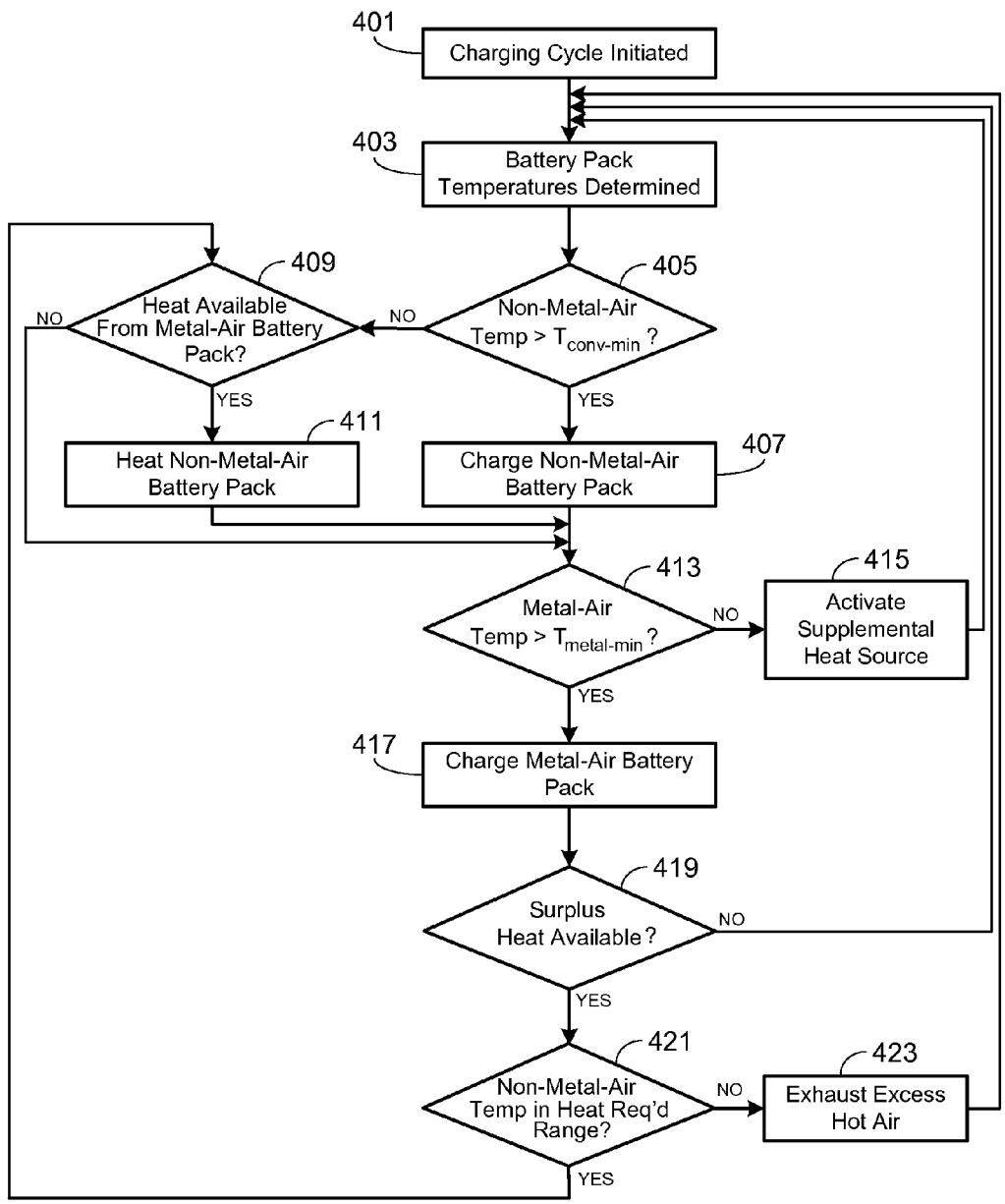
FIG. 4 illustrates a preferred methodology for use with the apparatus illustrated in FIG. 3.

FIG. 4 illustrates the methodology applied in one embodiment of the invention. While thermal energy from metal-air battery pack 101 may be used at any time to provide heat to conventional battery pack 103, typically it is only required when the battery packs are cold. Accordingly, in the exemplary process shown in FIG. 4, the process starts when the charging cycle is first initiated (step 401). It will be understood, however, that heat may be supplied from the metal-air battery pack to the conventional battery pack at any time it is required to achieve an optimal operating temperature.

After process initiation, the temperature of the battery packs is determined (step 403) using sensors 339/341. While the temperature requirements of the two battery packs will depend upon the specific chemistries of the cells selected for each battery pack, in general the minimum temperature requirements of the conventional battery pack are higher than those of the metal-air battery pack. In step 405 the temperature of conventional battery pack 103 is compared to a target temperature. In a preferred embodiment, the target temperature is the minimum temperature, $T_{conv-min}$, at which charging is allowed. In one embodiment $T_{conv-min}$ is equal to 20° C. If the temperature of conventional battery pack 103 is greater than the target temperature (e.g., $T_{conv-min}$), charging of the conventional battery pack is started (step 407). If the temperature of conventional battery pack 103 is less than the target temperature, then controller 203 determines if thermal energy is available from metal-air battery pack 101 (step 409). If thermal energy is available from metal-air battery pack 101, then controller 203 causes heat to be transferred to the conventional battery pack (step 411), for example by opening valve 335 so that heat can be transferred via heat exchanger 333 and insuring that coolant is being pumped through coolant loop 317, battery pack 103 and heat exchanger 333.

At step 413, the temperature of metal-air battery pack 101 is compared to its target temperature. In a preferred embodiment, the metal-air target temperature is the minimum temperature, $T_{metal-min}$, at which charging is allowed. In one embodiment $T_{metal-min}$ is equal to 0° C. As previously noted, typically $T_{metal-min}$ is less than $T_{conv-min}$ due to the different chemistries employed by the two types of cells. If the temperature of metal-air battery pack 101 is less than its corresponding target temperature, then preferably controller 203 activates a supplemental battery pack heating system (step 415). The supplemental heating system may be comprised, for example, of a heater 347 (e.g., PTC heater) coupled to the metal-air battery pack. If the temperature of metal-air battery pack 101 is greater than its corresponding target temperature, charging of the metal-air cells is started (step 417).

At step 419, controller 203 determines if the metal-air battery pack has warmed up to a sufficient degree to allow heat to be transferred to conventional battery pack 103. In at least one embodiment, a small amount of heat is always passed to heat exchanger 333. In at least one alternate embodiment, a small amount of heat is passed to heat exchanger 333 only if the metal-air battery pack temperature is greater than a second preset temperature, $T_{metal-min2}$. Limiting the transfer of thermal energy out of the metal-air battery pack insures that the metal-air batteries quickly increase temperature to a temperature that allows more efficient charging. Once the temperature of metal-air battery pack 101 exceeds a third preset temperature, $T_{metal-min3}$, controller 203 passes a much larger amount of thermal energy to the conventional battery pack via valve 335 and heat exchanger 333. In one embodiment $T_{metal-min3}$ is equal to 50° C.

If thermal energy is available from metal-air battery pack 101, then controller 203 determines whether the conventional battery pack requires heating, or if it is already in the desired temperature range (step 421). If excess thermal energy is available from the metal-air battery pack and the conventional batteries need to be heated, then controller 203 allows heat to be transferred to the conventional battery pack as previously noted (see steps 409/411). If excess thermal energy is available but the conventional batteries do not need further heating, then controller 203 exhausts the excess hot air (step 423).

In the embodiment described above, metal-air battery pack 101 has a lower allowed charging temperature than the conventional battery pack. As a result, when the temperature of the cells is low, i.e., lower than the allowed charging temperature of the conventional cells, the metal-air cells begin charging first. Then as the temperature of the metal-air battery pack increases, excess thermal energy is transferred to the conventional battery pack, thus increasing the temperature of the conventional cells. Once the temperature of the conventional cells has been raised sufficiently, charging of the conventional cells is allowed to commence.

In at least one preferred embodiment of the invention, controller 203 modulates the flow of thermal energy between the metal-air battery pack and the conventional battery pack, as well as modulating the flow of thermal energy out of exhaust 329, thereby optimizing the temperature of each of the battery packs. Preferably controller 203 also controls refrigeration subsystem 303 and the cooling subsystem 301, thus allowing further optimization of the temperature of both battery packs 101 and 103. It will be appreciated, and as previously noted, this control may extend beyond the charging cycle and also be used to optimize the battery pack temperatures during the discharge cycle.

Figure 5:
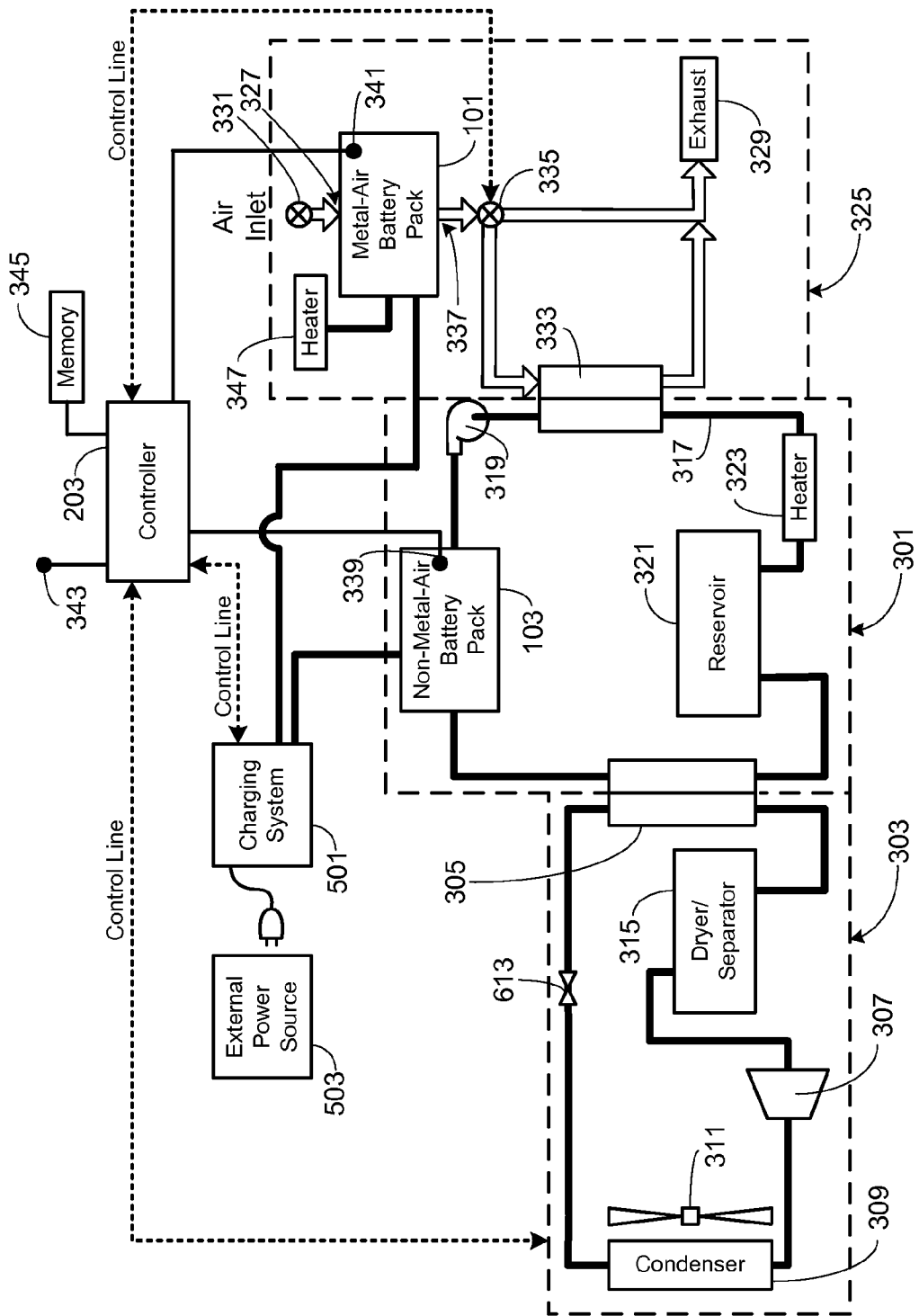
FIG. 5 illustrates a variation of the system shown in FIG. 3.

FIG. 5 illustrates a modification of the system shown in FIG. 3. In this embodiment, controller 203 is also coupled to, and provides control over, charging system 501. Preferably charging system 501 controls the charging parameters (e.g., charge rate, cut-off voltage, etc.) applied during the charging of metal-air battery pack 101 and conventional battery pack 103 as well as monitoring their state-of-charge (SOC). Charging system 501 is preferably integrated within EV 100. Alternately, in at least one embodiment the portion of the charging system that converts external power to a power level (e.g., voltage) that is compatible with the battery packs is external to the vehicle while a second portion of the charging system that controls charging characteristics such as cut-off voltage, charging rate, etc. is internal to the vehicle. Alternately, the entire charging system may be external to EV 100.

In at least one preferred embodiment, charging system 501 is configured to be plugged into, or otherwise connected to, an external power source 503. A municipal power grid is one example of an external power source 503. Charging system 501 insures that the power from source 503 is converted to a form of power storable by battery packs 101 and 103. For example, charging system 501 typically includes an AC to DC rectifier in order to convert power from the power source to that required by the batteries. It will be appreciated that in some embodiments the battery packs may be charged in whole or in part by an on-board power generator, which is coupled to the battery packs via charging system 501. In at least one preferred embodiment, external power source 503 is preferred for providing a full charge to batteries while the on-board power generator (e.g., regenerative braking system) is used only to augment the charge within the battery packs.

Figure 6:
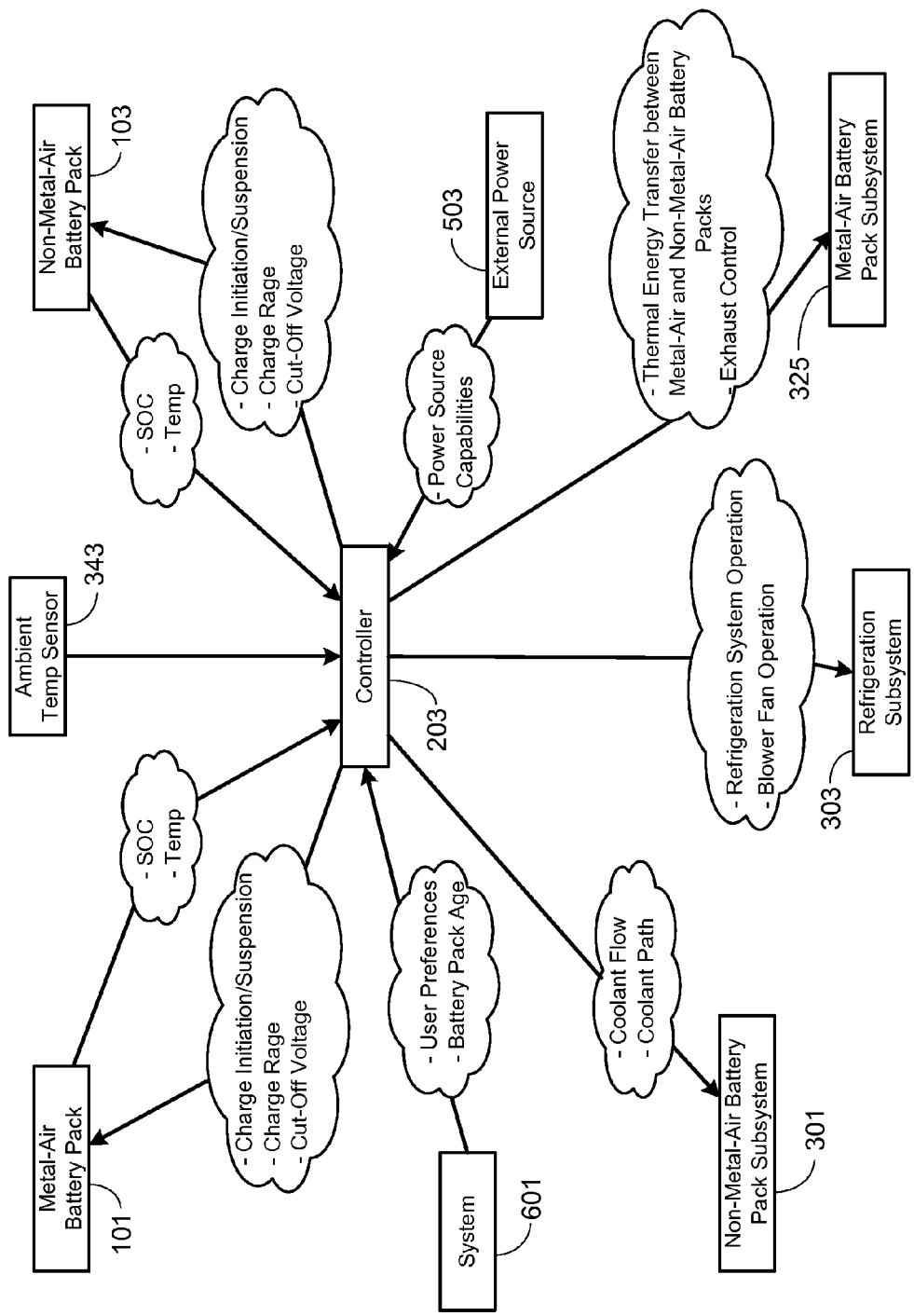
FIG. 6 illustrates the overall flow of the system that allows battery pack charge optimization to be accomplished.

In a preferred embodiment of the invention, controller 203 is used to optimize the charging of both battery packs, i.e., metal-air battery pack 101 and non-metal-air battery pack 103. In particular, and as illustrated in FIG. 6, controller 203 obtains input from each of the battery packs 101 and 103 (e.g., SOC and battery pack temperature), from the ambient temperature sensor, and from the external power source 503 (e.g., power source capabilities). Other data, such as battery pack age and user driving preferences (e.g., long range, high performance), may also be provided to controller 203, for example from the EV's operating system 601. Controller 203 uses this information to control the charging of both battery packs via charger 501, and to control the temperature of each of the battery packs via control of refrigeration subsystem 303, conventional battery pack cooling subsystem 301, and metal-air battery pack airflow subsystem 325.

It should be understood that while the preferred technique for transferring thermal energy from the metal-air battery pack to the conventional battery pack is illustrated and described above, other techniques may also be used. For example, rather than passing the heated air through heat exchanger 333, the heated air could be forced to pass directly through conventional battery pack 103, thereby directly heating the cells.

While both the metal-air battery pack 101 and the conventional battery pack 103 are shown and described as singular packs, it should be understood that one or both of these packs may be comprised of multiple modules, and that the present invention is equally applicable to such a configuration. The use of multiple modules (or mini-battery packs) may be useful in distributing weight throughout EV 100, or to fit into the physical constraints of the EV's chassis/body, and does not impact the present invention.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A method of controlling battery pack temperature during charging, the method comprising the steps of:
    coupling an external power source to a battery charging system, wherein said battery charging system is coupled to a first battery pack comprised of a plurality of metal-air cells and coupled to a second battery pack comprised of a plurality of non-metal-air cells;
    initiating charging of said first battery pack;
    determining a second battery pack temperature corresponding to said second battery pack;
    comparing said second battery pack temperature to a first preset temperature;
    initiating charging of said second battery pack if said second battery pack temperature is greater than said first preset temperature and not initiating charging of said second battery pack if said second battery pack temperature is less than said first preset temperature; and
    heating said second battery pack if said second battery pack temperature is less than first preset temperature, wherein said heating step further comprises the step of transferring thermal energy from said first battery pack to said second battery pack.

2. The method of claim 1, said step of transferring thermal energy from said first battery pack to said second battery pack further comprising the steps of:
    directing airflow from a first battery pack outlet through a heat exchanger; and
    pumping a heat transfer medium through a coolant loop, wherein said coolant loop is in thermal communication with said second battery pack and with said heat exchanger.

3. The method of claim 1, said heating step further comprising the steps of:
    determining a first battery pack temperature corresponding to said first battery pack;
    comparing said first battery pack temperature to a second preset temperature;
    transferring thermal energy from said first battery pack to said second battery pack at a first rate if said first battery pack temperature is less than said second preset temperature; and
    transferring thermal energy from said first battery pack to said second battery pack at a second rate if said first battery pack temperature is greater than said second preset temperature, wherein said second rate is greater than said first rate.

4. The method of claim 3, wherein said step of transferring thermal energy from said first battery pack to said second battery pack at said first rate further comprises the steps of directing air from a first battery pack outlet through a heat exchanger at a first airflow and pumping a heat transfer medium through a coolant loop, wherein said coolant loop is in thermal communication with said second battery pack and with said heat exchanger; and wherein said step of transferring thermal energy from said first battery pack to said second battery pack at said second rate further comprises the steps of directing air from said first battery pack outlet through said heat exchanger at a second airflow and pumping said heat transfer medium through said coolant loop, wherein said second airflow is greater than said first airflow.

5. The method of claim 1, said heating step further comprising the steps of:
    determining a first battery pack temperature corresponding to said first battery pack;
    comparing said first battery pack temperature to a second preset temperature;
    transferring thermal energy from said first battery pack to said second battery pack if said first battery pack temperature is greater than said second preset temperature and not transferring thermal energy from said first battery pack to said second battery pack if said first battery pack temperature is less than said second preset temperature.

6. The method of claim 5, said step of transferring thermal energy from said first battery pack to said second battery pack further comprising the steps of:
    directing airflow from a first battery pack outlet through a heat exchanger; and
    pumping a heat transfer medium through a coolant loop, wherein said coolant loop is in thermal communication with said second battery pack and with said heat exchanger.

7. The method of claim 1, further comprising the steps of:
    determining a first battery pack state-of-charge (SOC);
    comparing said first battery pack SOC with a first target SOC;
    terminating charging of said first battery pack when said first battery pack SOC reaches or exceeds said first target SOC;
    determining a second battery pack SOC;
    comparing said second battery pack SOC with a second target SOC; and
    terminating charging of said second battery pack when said second battery pack SOC reaches or exceeds said second target SOC.

8. The method of claim 1, further comprising the step of selecting said non-metal-air batteries from the group consisting of lithium ion cells, lithium ion polymer cells, nickel metal hydride cells, nickel cadmium cells, nickel hydrogen cells, nickel zinc cells, and silver zinc cells.

9. The method of claim 1, further comprising the steps of:
    determining a first battery pack temperature corresponding to said first battery pack;
    comparing said first battery pack temperature to a second preset temperature;
    initiating charging of said first battery pack if said first battery pack temperature is greater than said second preset temperature and not initiating charging of said first battery pack if said first battery pack temperature is less than said second preset temperature; and
    heating said first battery pack with a supplemental heating system if said first battery pack temperature is less than second preset temperature.

10. A method of controlling battery pack charging conditions, the method comprising the steps of:

coupling an external power source to a battery charging system, wherein said battery charging system is coupled to a first battery pack comprised of a plurality of metal-air cells and coupled to a second battery pack comprised of a plurality of non-metal-air cells;

monitoring a first battery pack temperature corresponding to said first battery pack;

monitoring a second battery pack temperature corresponding to said second battery pack;

determining a first battery pack state-of-charge (SOC);

comparing said first battery pack SOC with a first target SOC;

determining a second battery pack SOC;

comparing said second battery pack SOC with a second target SOC; and optimizing said second battery pack temperature to minimize charge time for said second battery pack to reach said second target SOC, said second battery pack temperature optimizing step further comprising the steps of:

controlling a transfer rate of thermal energy from said first battery pack to said second battery pack, wherein said thermal energy is transferred via a first heat exchanger;

controlling coolant flow rates within a coolant loop in thermal communication with said second battery pack and said first heat exchanger; and controlling a second battery pack charge rate.

11. The method of claim 10, said step of controlling said transfer of thermal energy from said first battery pack to said second battery pack further comprising the step of directing airflow from a first battery pack outlet through said first heat exchanger.

12. The method of claim 10, said second battery pack temperature optimizing step further comprising the step of controlling operation of a refrigeration subsystem, said refrigeration subsystem in thermal communication with a second heat exchanger, wherein said coolant loop is in thermal communication with said second heat exchanger.

13. The method of claim 10, the method comprising the steps of:

optimizing said first battery pack temperature to minimize charge time for said first battery pack to reach said first target SOC, said first battery pack temperature optimizing step further comprising the steps of:

controlling said transfer rate of thermal energy from said first battery pack to said second battery pack;

controlling flow of thermal energy out of said first battery pack; and controlling a first battery pack charge rate.

14. The method of claim 13, said step of controlling flow of thermal energy out of said first battery pack further comprising the step of controlling airflow out of a first battery pack outlet and through an exhaust duct.

15. The method of claim 10, further comprising the step of monitoring ambient temperature.

* * * * *